(12) United States Patent
Fife

(10) Patent No.: US 6,322,912 B1
(45) Date of Patent: Nov. 27, 2001

(54) ELECTROLYTIC CAPACITOR ANODE OF VALVE METAL OXIDE

(75) Inventor: James A. Fife, Myrtle Beach, SC (US)

(73) Assignee: Cabot Corporation, Boston, MA (US)

(*) Notice: Subject to any disclaimer, the term of this patent is extended or adjusted under 35 U.S.C. 154(b) by 0 days.

(21) Appl. No.: 09/396,615

(22) Filed: Sep. 15, 1999

Related U.S. Application Data

(60) Provisional application No. 60/100,629, filed on Sep. 16, 1998.

(51) Int. Cl.$^7$ .......................... B32B 18/00; B32B 31/00; H01G 9/00
(52) U.S. Cl. .......................... 428/702; 361/528; 361/529
(58) Field of Search .................. 428/469, 472, 428/702; 361/529, 528

(56) References Cited

U.S. PATENT DOCUMENTS

| | | | |
|---|---|---|---|
| 1,415,516 | 5/1922 | Bridge . | |
| 1,906,184 | 4/1933 | Bohn . | |
| 2,183,517 | 12/1939 | Leemans et al. | 75/135 |
| 2,242,759 | 5/1941 | Schlecht et al. | 75/84 |
| 2,621,137 | 12/1952 | Miller | 148/13.1 |
| 2,700,606 | 12/1955 | Wilhelm et al. | 75/84 |
| 2,761,776 | 9/1956 | Bichowsky | 75/5 |
| 2,861,882 | 11/1958 | Bichowsky | 75/84 |
| 2,937,939 | 5/1960 | Wilhelm et al. | 75/84 |
| 2,992,095 | 7/1961 | Li | 75/27 |
| 3,421,195 | 1/1969 | Berryhill | 29/25.42 |
| 3,926,832 | 12/1975 | Barosi | 252/181.6 |
| 4,032,328 | 6/1977 | Hurd | 75/84.1 |
| 4,126,493 | 11/1978 | Wurm | 148/20 |
| 4,201,798 | 5/1980 | Lindmayer | 427/74 |
| 4,428,856 | 1/1984 | Boyarina et al. | 252/181.1 |
| 4,722,756 | 2/1988 | Hard | 148/126.1 |
| 4,916,576 * | 4/1990 | Herbert et al. | 361/393 |
| 4,923,531 | 5/1990 | Fisher | 148/126.1 |
| 4,960,471 | 10/1990 | Fife | 148/20.3 |
| 5,013,357 | 5/1991 | Worcester et al. | 75/622 |
| 5,022,935 | 6/1991 | Fisher | 148/126.1 |
| 5,142,452 * | 8/1992 | Saiki | 361/540 |
| 5,412,533 | 5/1995 | Murayama et al. | 361/528 |
| 5,448,447 * | 9/1995 | Chang | 361/529 |
| 5,822,177 * | 10/1998 | Popp et al. | 361/529 |
| 5,825,611 | 10/1998 | Pozdeev | 361/524 |
| 5,922,215 * | 7/1999 | Pless et al. | 361/529 |
| 5,949,639 * | 9/1999 | Maeda et al. | 361/529 |
| 6,088,217 * | 7/2000 | Patel et al. | 361/529 |

FOREIGN PATENT DOCUMENTS

| | | |
|---|---|---|
| 104631 | 8/1937 | (AU) . |
| 485318 | 5/1938 | (GB) . |
| 489742 | 8/1938 | (GB) . |
| 835316 | 5/1960 | (GB) . |

OTHER PUBLICATIONS

Abstract Document No. 129;284714.
Abstract Document No. 129:130191.
Abstract Document No. 128:288971.
Abstract Document No. 85:170443.
Abstract Document No. 83:140466.
Abstract Document No. 104:229152.
Abstract Document No. 104:198128.
Abstract Document No. 108:122980.
Abstract Document No. 106:42412.
Abstract Document No. 110:224093.
Abstract Document No. 103212.
Abstract Document No. 116:199338.
Abstract Document No. 113:10823.
Abstract Document No. 120:179957.
Abstract Document No. 119:84165.
Abstract Document No. 118:86049.
Pages 59, 65, and 66 of Encyclopedia of Chemical Technology, vol. 17, 4$^{th}$ Edition, 1996, No month.
Mellor "Inorganic and Theoretical Chemistry" vol. IX, pp. 856–857, No date.
Young article, pp. 4 and 5 of Chapter 2, No date.
International Search Report for PCT/US99/21413 mailed Sep. 16, 1999.

* cited by examiner

*Primary Examiner*—Steven Bos

(57) ABSTRACT

Methods to at least partially reduce valve metal oxides are described wherein the process includes heat treating the valve metal oxide in the presence of a getter material, in an atmosphere which permits the transfer of oxygen atoms from the starting valve metal oxide to the getter material, and for a sufficient time and at a sufficient temperature to form an oxygen reduced valve metal oxide. Valve metal oxides and/or suboxides thereof are also described as well as capacitors containing anodes made from the valve metal oxides and suboxides thereof.

31 Claims, 14 Drawing Sheets

ELECTROLYTIC CAPACITOR ANODE OF VALVE METAL OXIDE

This application is a continuation-in-part of U.S. Provisional Patent Application No. 60/100,629 filed Sep. 16, 1998, which is incorporated in its entirety by reference herein.

BACKGROUND OF THE INVENTION

The present invention relates to valve metals, other metals, and oxides thereof and more particularly relates to methods to at least partially reduce metal oxides and further relates to oxygen reduced valve metals and other metals.

SUMMARY OF THE PRESENT INVENTION

In accordance with the purposes of the present invention, as embodied and described herein, the present invention relates to a method to at least partially reduce a metal oxide selected from a valve metal oxide, which includes the steps of heat treating the metal oxide in the presence of a getter material like a tantalum and/or niobium getter material or other getter material capable of reducing the metal oxide, in an atmosphere which permits the transfer of oxygen atoms from the metal oxide to the getter material, for sufficient time and temperature to form an oxygen reduced valve metal oxide.

The present invention also relates to oxygen reduced valve metal oxides which preferably have beneficial properties, especially when formed into an electrolytic capacitor anode. For instance, a capacitor made from the oxygen reduced valve metal oxide of the present invention can have a capacitance of from about 1,000 CV/g or less to about 200,000 CV/g or more. Further, electrolytic capacitor anodes made from the oxygen reduced valve metal oxides of the present invention can have a low DC leakage. For instance, such a capacitor can have a DC leakage of from about 5.0 nA/CV to about 0.5 nA/CV.

Accordingly, the present invention also relates to methods to increase capacitance and reduce DC leakage in capacitors made from valve metal oxides, which involves partially reducing a valve metal oxide by heat treating the valve metal oxide in the presence of a getter material, like tantalum and/or niobium getter material, in an atmosphere which permits the transfer of oxygen atoms from the metal oxide to the getter material for a sufficient time and temperature to form an oxygen reduced valve metal oxide, which when formed into a capacitor anode, has reduced DC leakage and/or increased capacitance.

It is to be understood that both the foregoing general description and the following detailed description are exemplary and explanatory only and are intended to provide further explanation of the present invention, as claimed.

DETAILED DESCRIPTION OF THE PRESENT INVENTION

Figure 1:
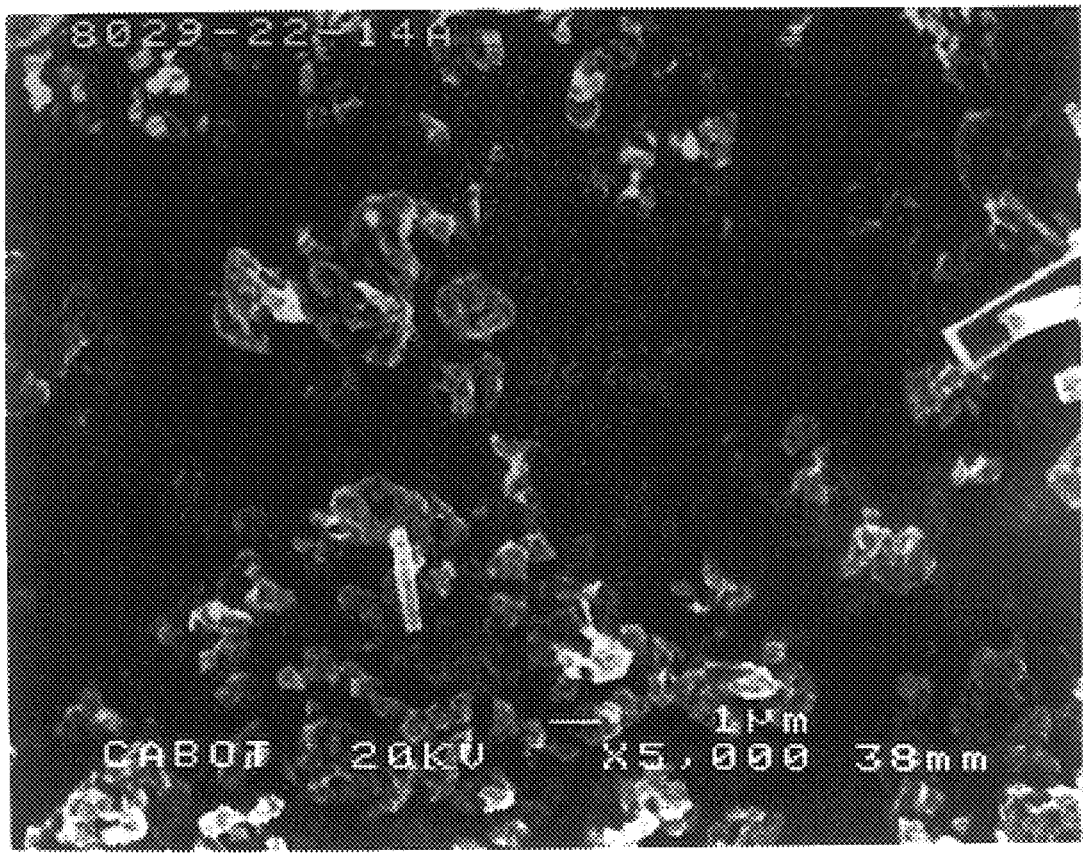
FIGS. 1–14 are SEMs of various oxygen reduced valve metal oxides of the present invention at various magnifications.

In an embodiment of the present invention, the present invention relates to methods to at least partially reduce a valve metal oxide. In general, the process includes the steps of heat treating the valve metal oxide in the presence of a getter material, which preferably is a tantalum and/or niobium getter material or other getter material depending on the metal oxide being reduced, in an atmosphere which permits the transfer of oxygen atoms from the metal oxide to the getter material, for a sufficient time and at a sufficient temperature to form an oxygen reduced valve metal oxide.

For purposes of the present invention, examples of starting valve metal oxides can be, but are not limited to, at least one oxide of the metals in Groups 4, 5, and 6 (IUPAC designations) of the Periodic Table, aluminum, bismuth, antimony, and alloys thereof and combinations thereof. Preferably, the valve metal oxide is an oxide of tantalum, aluminum, titanium, zirconium, niobium, and/or alloys thereof, and most preferably is a niobium oxide, a tantalum oxide, or alloys thereof. Generally, the alloys of the valve metal oxides will have the valve metal as the predominant metal present in the alloy oxide. Specific examples of starting valve metal oxides, include, but are not limited to $Nb_2O_5$, $Ta_2O_5$, and $Al_2O_3$.

The metal oxide can also be a metal oxide which is a semi-conductor as a lower oxide and which converts to a higher oxide with high insulating properties and has useful dielectric properties.

The valve metal oxide used in the present invention can be in any shape or size. Preferably, the valve metal oxide is in the form of a powder or a plurality of particles. Examples of the type of powder that can be used include, but are not limited to, flaked, angular, nodular, and mixtures or variations thereof. Preferably, the valve metal oxide is in the form of a powder which more effectively leads to the oxygen reduced valve metal oxides. Examples of such preferred metal oxide powders include those having mesh sizes of from about 60/100 to about 100/325 and from about 60/100 to about 200/325 mesh. Another range of size is from about –40 mesh to about –325 mesh.

The getter material for purposes of the present invention is any material capable of reducing the specific starting valve metal oxide. Preferably, for starting metal oxides like tantalum or niobium, and the like, the getter material is tantalum or niobium. More preferably, the getter material is the same type of base metal as the starting metal oxide. The tantalum getter material is any material containing tantalum metal which can remove or reduce at least partially the oxygen in the valve metal oxide. Thus, the tantalum getter material can be an alloy or a material containing mixtures of tantalum metal with other ingredients. Preferably, the tantalum getter material is predominantly, if not exclusively, tantalum metal. The purity of the tantalum metal is not important but it is preferred that high purity tantalum metal comprise the getter material to avoid the introduction of other impurities during the heat treating process. Accordingly, the tantalum metal in the tantalum getter material preferably has a purity of at least about 98% and more preferably at least about 99%. Further, it is preferred that impurities such as oxygen are not present or are present in amounts below about 100 ppm. Also, the tantalum metal as the getter material can have a high surface area and/or high porosity. Preferably, the tantalum or other getter material is a capacitor grade material such as tantalum having a capacitance capability of about 30,000 Cv/g or more and more preferably about 50,000 Cv/g or more and most preferably about 75,000 Cv/g to about 100,000 Cv/g or more. The getter material can be removed after being used or can remain. Preferably, if the getter material is to remain with the oxygen-reduced metal oxides, then it is preferred that the getter material be the same base metal as the starting metal oxide and have a similar shape and size to the starting metal oxide. Further, preferably high purity, high surface area, and high porosity getter material is used since such material will obtain the same or similar oxide state as the oxygen-reduced metal oxide. Thus, the method will achieve a 100% yield of oxygen reduced metal oxide. The getter material can therefore act as the getter material and also remain to become part of the oxygen-reduced niobium oxide.

The present invention can extend the amount of tantalum or other valve metal in products, such as a capacitor since an anode containing oxygen-reduced tantalum oxide (or other capacitor grade metal oxide) contains less tantalum than the same anode having just tantalum metal. Yet, the properties obtainable are similar, such as capacitance and DC leakage capabilities. This advantage can lead to cost savings and other advantages to capacitor manufacturers.

The tantalum getter material can be in any shape or size. For instance, the tantalum getter material can be in the form of a tray which contains the metal oxide to be reduced or can be in a particle or powder size. Preferably, the tantalum getter materials are in the form of a powder in order to have the most efficient surface area for reducing the metal oxide. The tantalum getter material, thus, can be flaked, angular, nodular, and mixtures or variations thereof. Preferably, the getter material is a tantalum hydride material. A preferred form is coarse chips, e.g., 14/40 mesh chips that can be easily separated from the powder product by screening.

Similarly, the getter material can be niobium and the like and can have the same preferred parameters and/or properties discussed above for the tantalum getter material. Other getter materials can be used alone or in combination with the tantalum or niobium getter materials for instance, magnesium, sodium, potassium, and the like. Again, these types of getter materials can contain other getter materials and/or other ingredients. For purposes of the present invention, the getter material is stable during the heat treatment step and is not volatizable at the heat treatment temperatures used for the specific starting valve metal oxide being reduced. Also, other materials can form a part of the getter material.

Generally, a sufficient amount of getter material (e.g., oxygen getter material) is present to at least partially reduce the valve metal oxide being heat treated. Further, the amount of the getter material is dependent upon the amount of reducing desired to the metal oxide. For instance, if a slight reduction in the metal oxide is desired, then the getter material will be present in a stoichemetric amount. Similarly, if the metal oxide is to be reduced substantially with respect to its oxygen presence, then the getter material is present in a 2 to 5 times stoichemetric amount. As an example, the amount of getter material present (e.g., based on the tantalum getter material being 100% tantalum and $Ta_2O_5$ as the metal oxide) as a ratio of getter material to the amount of metal oxide present can be from about 2 to 1 to about 10 to 1.

Furthermore, the amount of getter material can also be dependent on the type of metal oxide being reduced. For instance, when a niobium oxide (e.g., $Nb_2O_5$) is being reduced, the amount of getter material is preferably 5 to 1. When the starting valve metal oxide is $Ta_2O_5$, the amount of getter material is preferably 3 to 1.

The heat treating that the starting metal oxide is subjected to can be conducted in any heat treatment device or furnace commonly used in the heat treatment of metals, such as niobium and tantalum. The heat treatment of the metal oxide in the presence of the getter material is at a sufficient temperature and for a sufficient time to form an oxygen reduced valve metal oxide. The temperature and time of the heat treatment can be dependent on a variety of factors such as the amount of reduction of the valve metal oxide, the amount of the getter material, and the type of getter material as well as the type of starting metal oxide. The heat treatment can be at any temperature which permits the reducing of the starting valve metal oxide and which is below the melting point of the valve metal oxide being reduced. Generally, the heat treatment of the starting metal oxide will be at a temperature of from about 800° C. or less to about 1900° C. and more preferably from about 1000° C. to about 1400° C., and most preferably from about 1100° C. to about 1250° C. In more detail, when the valve metal oxide is a tantalum containing oxide, the heat treatment temperatures will be from about 1000° C. to about 1300° C., and more preferably from about 1100° C to about 1250° C. for a time of from about 5 minutes to about 100 minutes, and more preferably from about 30 minutes to about 60 minutes. Routine testing in view of the present application will permit one skilled in the art to readily control the times and temperatures of the heat treatment in order to obtain the proper or desired reduction of the metal oxide.

The heat treatment occurs in an atmosphere which permits the transfer of oxygen atoms from the metal oxide to the getter material. The heat treatment preferably occurs in a hydrogen containing atmosphere which is preferably just hydrogen. Other gases can also be present with the hydrogen, such as inert gases, so long as the other gases do not react with hydrogen. Preferably, the hydrogen atmosphere is present during the heat treatment at a pressure of from about 10 Torr to about 2000 Torr, and more preferably from about 100 Torr to about 1000 Torr, and most preferably from about 100 Torr to about 930 Torr. Mixtures of $H_2$ and an inert gas such as Ar can be used. Also, $H_2$ in $N_2$ can be used to effect control of the $N_2$ level of the valve metal oxide.

During the heat treatment process, a constant heat treatment temperature can be used during the entire heat treating process or variations in temperature or temperature steps can be used. For instance, hydrogen can be initially admitted at 1000° C. followed by increasing the temperature to 1250° C. for 30 minutes followed by reducing the temperature to 1000° C. and held there until removal of the $H_2$ gas. After the $H_2$ or other atmosphere is removed, the furnace temperature can be dropped. Variations of these steps can be used to suit any preferences of the industry.

The oxygen reduced metal oxides can also contain levels of nitrogen, e.g., from about 100 ppm to about 30,000 ppm $N_2$.

The oxygen reduced valve metal oxide is any metal oxide which has a lower oxygen content in the metal oxide compared to the starting valve metal oxide. Typical reduced valve metal oxides comprise NbO, $NbO_{0.7}$, $NbO_{1.1}$, $NbO_2$, TaO, AlO, $Ta_6O$, $Ta_2O$, $Ta_2O_{2.2}$, or any combination thereof with or without other oxides present. Generally, the reduced metal oxide of the present invention has an atomic ratio of metal to oxygen of about 1: less than 2.5, and preferably 1:2 and more preferably 1:1.1, 1:1, or 1:0.7. Put another way, the reduced metal oxide preferably has the formula $M_xO_y$, wherein M is a valve metal, x is 2 or less, and y is less than 2.5x. More preferably x is 1 and y is less than 2, such as 1.1, 1.0, 0.7, and the like. Preferably, when the reduced valve metal oxide is tantalum, the reduced metal oxide has an atomic ratio of metal to oxygen of about 1: less than 2, such as 1:0.5, 1:1, or 1:0.167 or has a ratio of 2:2.2.

The starting valve metal oxides can be prepared by calcining at 1000° C. until removal of any volatile components. The oxides can be sized by screening. Preheat treatment of the oxides can be used to create controlled porosity in the oxide particles.

The reduced metal oxides of the present invention also preferably have a microporous surface and preferably have a sponge-like structure, wherein the primary particles are preferably about 1 micron or less. The reduced metal oxides of the present invention preferably have a high specific surface area, and a porous structure with approximately 50% porosity. Further, the reduced metal oxides of the present invention can be characterized as having a preferred specific surface area of from about 0.5 to about 10.0 m$^2$/g, more preferably from about 0.5 to about 2.0 m$^2$/g, and even more preferably from about 1.0 to about 1.5 m$^2$/g. The preferred apparent density of the powder of the metal oxides is less than about 2.0 g/cc, more preferably, less than 1.5 g/cc and more preferably, from about 0.5 to about 1.5 g/cc.

The various oxygen reduced valve metal oxides of the present invention can be further characterized by the electrical properties resulting from the formation of a capacitor anode using the oxygen reduced metal oxides of the present invention. In general, the oxygen reduced metal oxides of the present invention can be tested for electrical properties by pressing powders of the oxygen reduced metal oxide into an anode and sintering the pressed powder at appropriate temperatures and then anodizing the anode to produce an electrolytic capacitor anode which can then be subsequently tested for electrical properties.

Accordingly, another embodiment of the present invention relates to anodes for capacitors formed from the oxygen reduced valve metal oxides of the present invention. Anodes can be made from the powdered form of the reduced oxides in a similar process as used for fabricating metal anodes, i.e., pressing porous pellets with embedded valve metal lead wires followed by sintering and anodizing. Anodes made from some of the oxygen reduced metal oxides of the present invention can have a capacitance of from about 20,000 or lower CV/g to about 300,000 CV/g or more, and other ranges of capacitance can be from about 62,000 CV/g to about 200,000 CV/g and preferably from about 60,000 to 150,000 CV/g. In forming the capacitor anodes of the present invention, a sintering temperature can be used which will permit the formation of a capacitor anode having the desired properties. The sintering temperature will be based on the oxygen reduced metal oxide used. Preferably, the sintering temperature is from about 1200° C. to about 1750° C. and more preferably from about 1200° C. to about 1400° C. and most preferably from about 1250° C. to about 1350° C. when the oxygen reduced valve metal oxide is an oxygen reduced niobium oxide. The sintering temperatures when the oxygen reduced valve metal oxide is an oxygen reduced tantalum oxide can be the same as for niobium oxides.

The anodes formed from the valve metal oxides of the present invention are preferably formed at a voltage of from about 1 volt to about 35 volts, and preferably from about 6 to about 70 volts. Furthermore, when an oxygen reduced niobium oxide is used, preferably, the forming voltages are from about 6 to about 50 volts, and more preferably from about 10 to about 40 volts. Other higher formation voltages can be used. Anodes of the reduced metal oxides can be prepared by fabricating a pellet with a lead wire or other connector followed by treatment in H$_2$ atmosphere or other suitable atmosphere in the proximity of a getter material, just as with powdered metal oxides of the present invention, followed by optional sintering and anodizing. In this embodiment, the anode article produced can be produced directly, e.g., forming the oxygen reduced metal oxide and an anode at the same time. The lead connector can be embedded or attached at any time before anodizing. Forming voltages using other metal oxides are expected to be similar or about the same and can even be higher for valve metal oxides like tantalum oxides. Also, the anodes formed from the oxygen reduced metal oxides of the present invention preferably have a DC leakage of less than about 5.0 nA/CV. For instance, in an embodiment of the present invention, the anodes formed from some of the oxygen reduced niobium oxides of the present invention have a DC leakage of from about 5.0 nA/CV to about 0.50 nA/CV.

The present invention also relates to a capacitor in accordance with the present invention having a metal oxide film on the surface of the capacitor. Preferably, when the oxygen reduced valve metal oxide is an oxygen reduced niobium oxide, the film is a niobium pentoxide film. The means of making metal powder into capacitor anodes is known to those skilled in the art and such methods such as those set forth in U.S. Pat. Nos. 4,805,074, 5,412,533, 5,211,741, and 5,245,514, and European Application Nos. 0 634 762 A1 and 0 634 761 A1, all of which are incorporated in their entirety herein by reference.

The capacitors of the present invention can be used in a variety of end uses such as automotive electronics, cellular phones, computers, such as monitors, mother boards, and the like, consumer electronics including TVs and CRTs, printers/copiers, power supplies, modems, computer notebooks, disc drives, and the like.

The present invention will be further clarified by the following examples, which are intended to be exemplary of the present invention.

Anode Fabrication:

size - 0.197" dia
3.5 Dp
powder wt = 341 mg
Anode Sintering:

1300 Deg C.* 10'
1450 Deg C.* 10'
1600 Deg C.* 10'
1750 Deg C.* 10'
30V Ef Anodization:

30V Bf @ 60 Deg C/0. 1% H$_3$PO$_4$ Electrolyte
20 mA/g constant current
DC Leakage/Capacitance - ESR Testing:

DC Leakage Testing ---
70% Ef (21 VDC) Test Voltage
60 second charge time
10% H$_3$PO$_4$ @ 21 Deg C.
Capacitance - DF Testing:
18% H$_2$SO$_4$ @ 21 Deg C.
120 Hz
50V Ef Reform Anodization:

50V Ef @ 60 Deg C./0.1% H$_3$PO$_4$ Electrolyte
20 mA/g constant current
DC Leakage/Capacitance - ESR Testing:

DC leakage Testing ---
70% Ef (35 VDC) Test Voltage
60 second charge time
10% H$_3$PO$_4$ @ 21 Deg C.
Capacitance - DF Testing:
18% H$_2$SO$_4$ @ 21 Deg C.
120 Hz

-continued

75V Ef Reform Anodization:

75V Ef @ 60 Deg C./0 1% $H_3PO_4$ Electrolyte
20 mA/g constant current
DC Leakage/Capacitance - ESR Testing:

DC leakage Testing ---
70% Ef (52.5 VDC) Test Voltage
60 second charge time
10% $H_3PO_4$ @ 21 Deg C.
Capacitance - DF Testing:
18% $H_2SO_4$ @ 21 Deg C.
120 Hz Scott Density, oxygen analysis, phosphorus analysis, and BET analysis were determined according to the procedures set forth in U.S. Pat. Nos. 5,011,742; 4,960,471; and 4,964,906, all incorporated hereby in their entireties by reference herein.

EXAMPLES

Example 1

+10 mesh Ta hydride chips (99.2 gms) with approximately 50 ppm oxygen were mixed with 22 grams of $Nb_2O_5$ and placed into Ta trays. The trays were placed into a vacuum heat treatment furnace and heated to 1000° C. $H_2$ gas was admitted to the furnace to a pressure of +3psi. The temperature was further ramped to 1240° C. and held for 30 minutes. The temperature was lowered to 1050° C. for 6 minutes until all $H_2$ was swept from the furnace. While still holding 1050° C., the argon gas was evacuated from the furnace until a pressure of $5 \times 10^{-4}$ torr was achieved. At this point 700 mm of argon was readmitted to the chamber and the furnace cooled to 60° C.

The material was passivated with several cyclic exposures to progressively higher partial pressures of oxygen prior to removal from the furnace as follows: The furnace was backfilled with argon to 700 mm followed by filling to one atmosphere with air. After 4 minutes the chamber was evacuated to $10^{-2}$ torr. The chamber was then backfilled to 600 mm with argon followed by air to one atmosphere and held for 4 minutes. The chamber was evacuated to $10^{-2}$ torr. The chamber was then backfilled to 400 mm argon followed by air to one atmosphere. After 4 minutes the chamber was evacuated to $10^{-2}$ torr. The chamber was them backfilled to 200 mm argon followed by air to one atmosphere and held for 4 minutes. The chamber was evacuated to $10^{-2}$ torr. The chamber was backfilled to one atmosphere with air and held for 4 minutes. The chamber was evacuated to $10^{-2}$ torr. The chamber was backfilled to one atmosphere with argon and opened to remove the sample.

The powder product was separated from the tantalum chip getter by screening through a 40 mesh screen. The product was tested with the following results.

CV/g of pellets sintered to 1300° C. × 10 minutes and
formed to 35 volts = 81,297
nA/CV (DC leakage) = 5.0
Sintered Density of pellets = 2.7 g/cc
Scott density = 14.41 g/in3
Chemical Analysis (ppm)
$H_2$ = 56
Ti = 25  Fe = 25

-continued

Mn = 10  Si = 25
Sn = 5  Ni = 5
Cr = 10  Al = 5
Mo = 25  Mg = 5
Cu = 50  B = 2
Pb = 2  all others < limits

Example 2

Samples 1 through 23 are examples following similar steps as above with powdered $Nb_2O_5$ as indicated in the Table. For most of the examples, mesh sizes of the starting input material are set forth in the Table, for example 60/100, means smaller than 60 mesh, but larger than 100 mesh. Similarly, the screen size of some of the Ta getter is given as 14/40. The getters marked as "Ta hydride chip" are +40 mesh with no upper limit on particle size.

Sample 18 used Nb as the getter material (commercially available N200 flaked Nb powder from CPM). The getter material for sample 18 was fine grained Nb powder which was not separated from the final product. X-ray diffraction showed that some of the getter material remained as Nb, but most was converted to $NbO_{1.1}$ and NbO by the process as was the starting valve metal oxide material $Nb_2O_5$.

Sample 15 was a pellet of $Nb_2O_5$, pressed to near solid density, and reacted with H2 in close proximity to the Ta getter material. The process converted the solid oxide pellet into a porous slug of NbO suboxide. This slug was sintered to a sheet of Nb metal to create an anode lead connection and anodized to 35 volts using similar electrical forming procedures as used for the powder slug pellets. This sample demonstrates the unique ability of this process to make a ready to anodize slug in a single step from $Nb_2O_5$ starting material.

Figure 2:
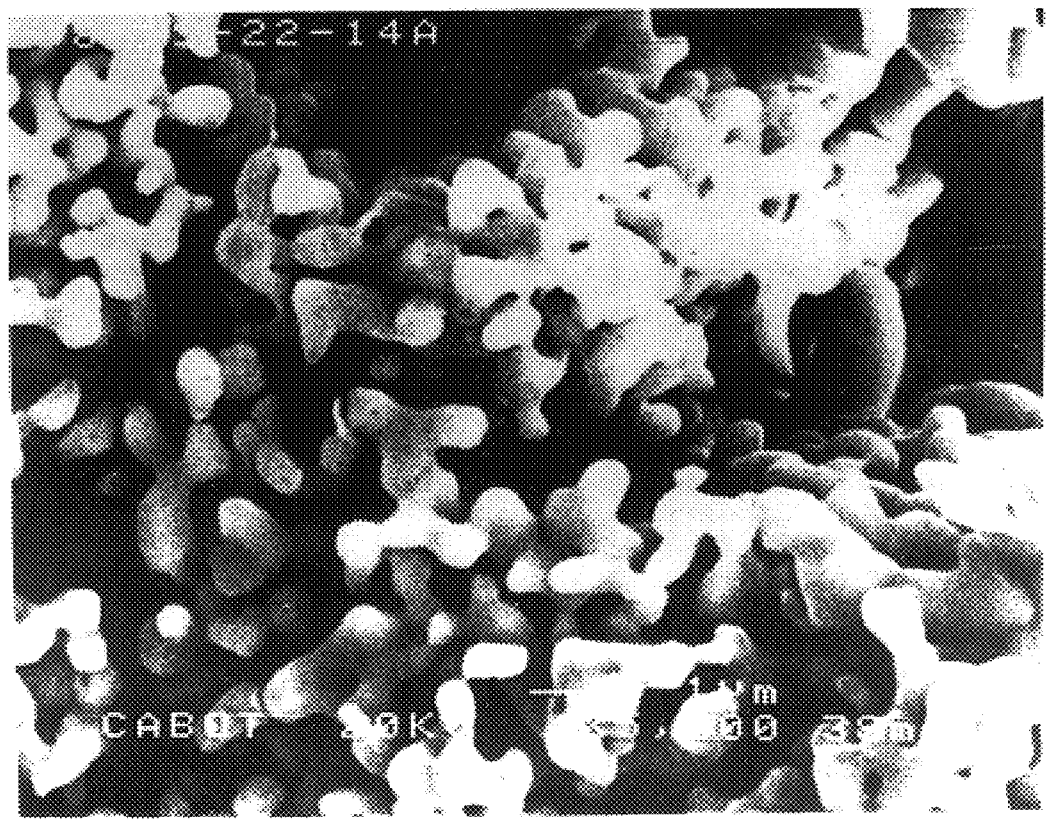
Figure 3:
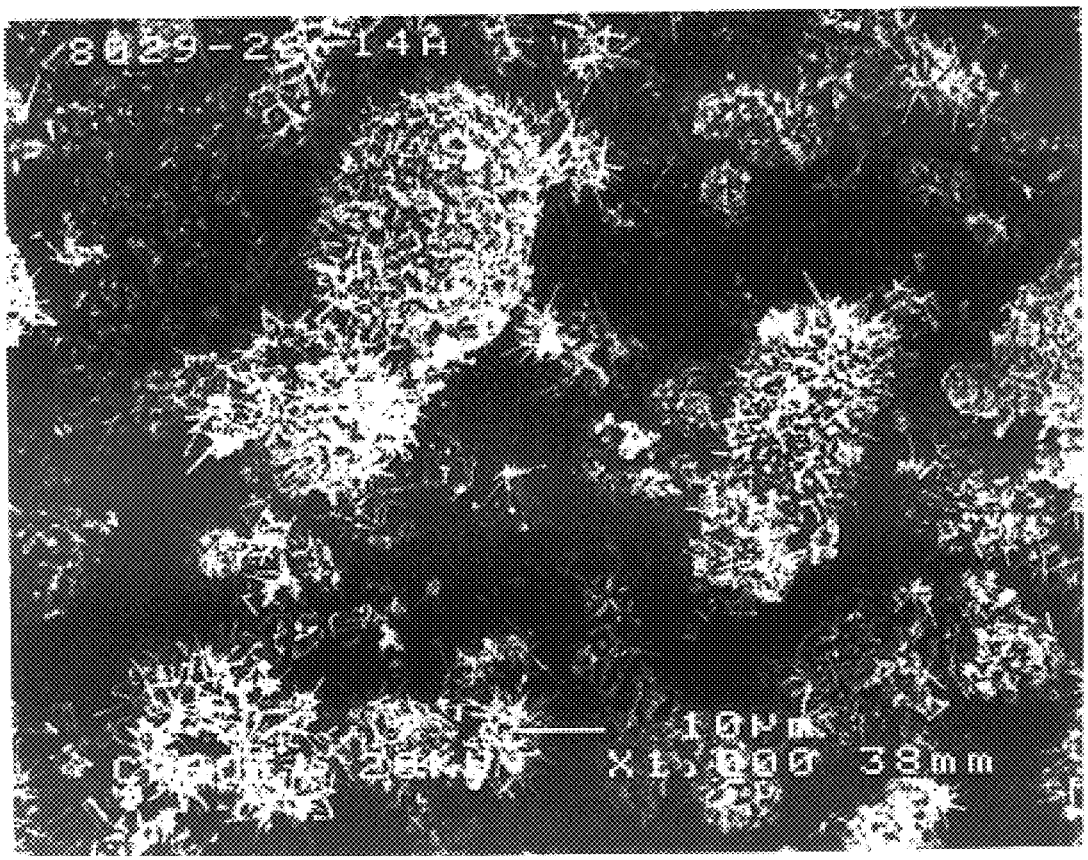
Figure 4:
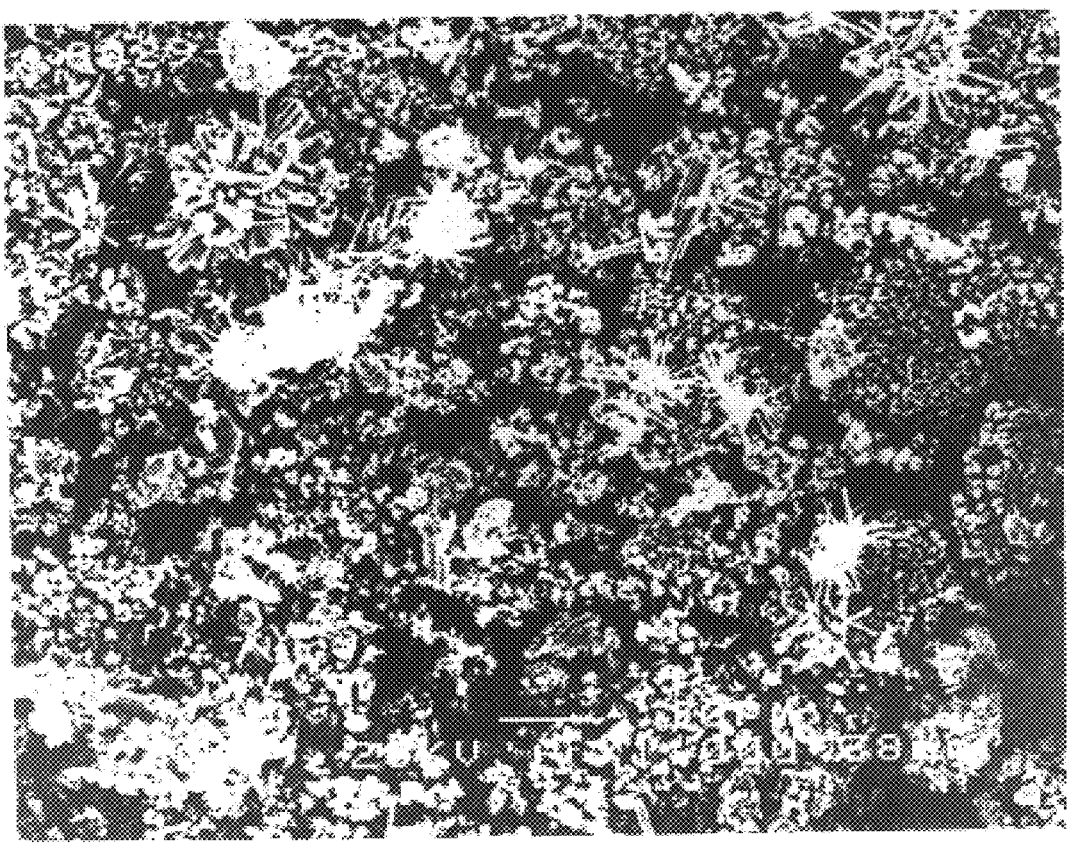
Figure 5:
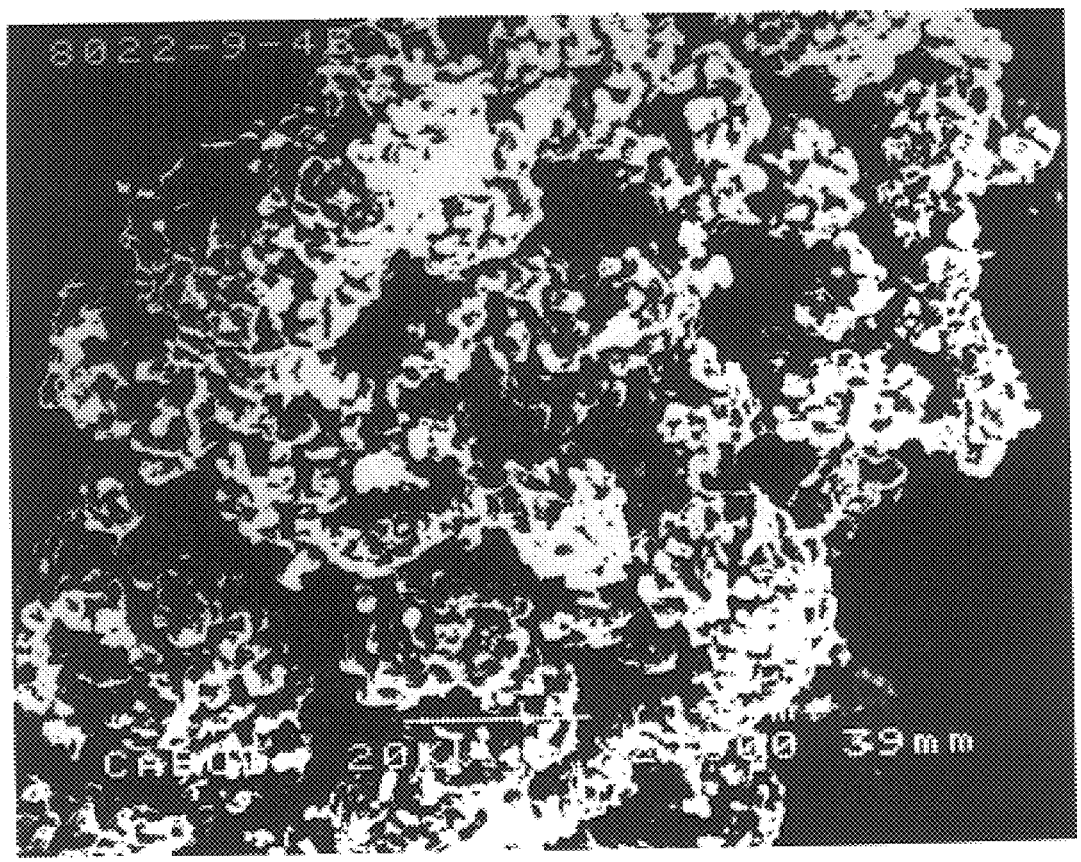
Figure 6:
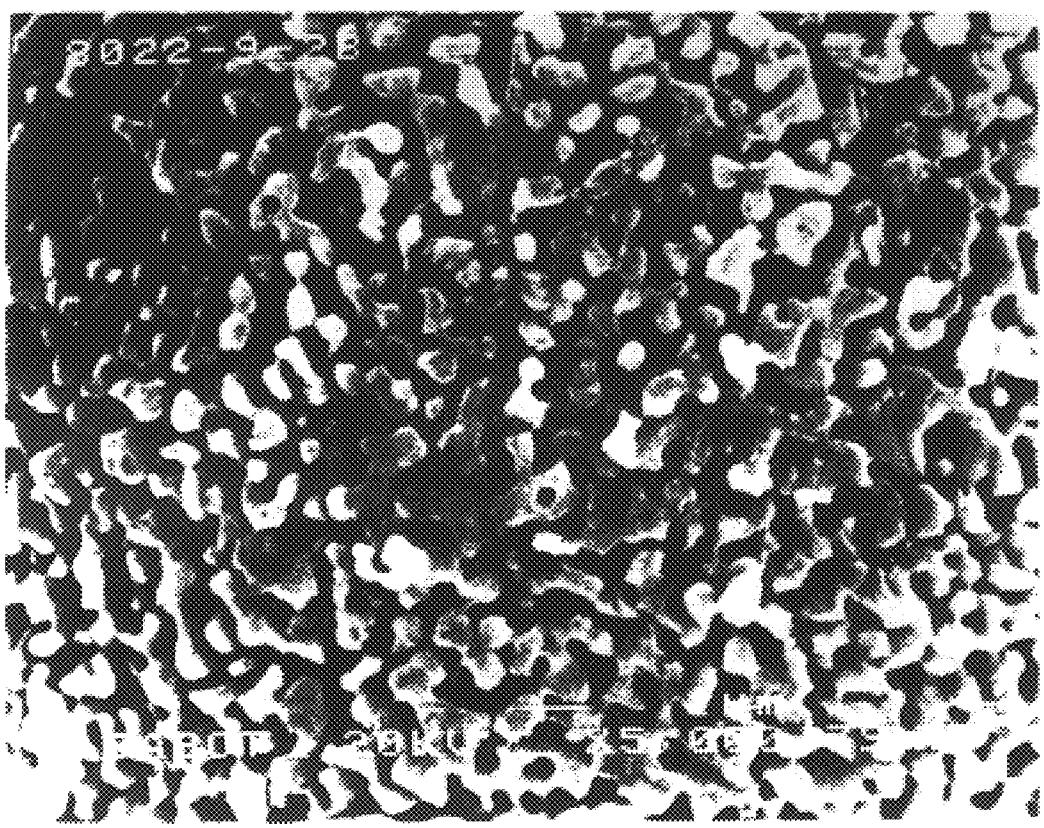
Figure 7:
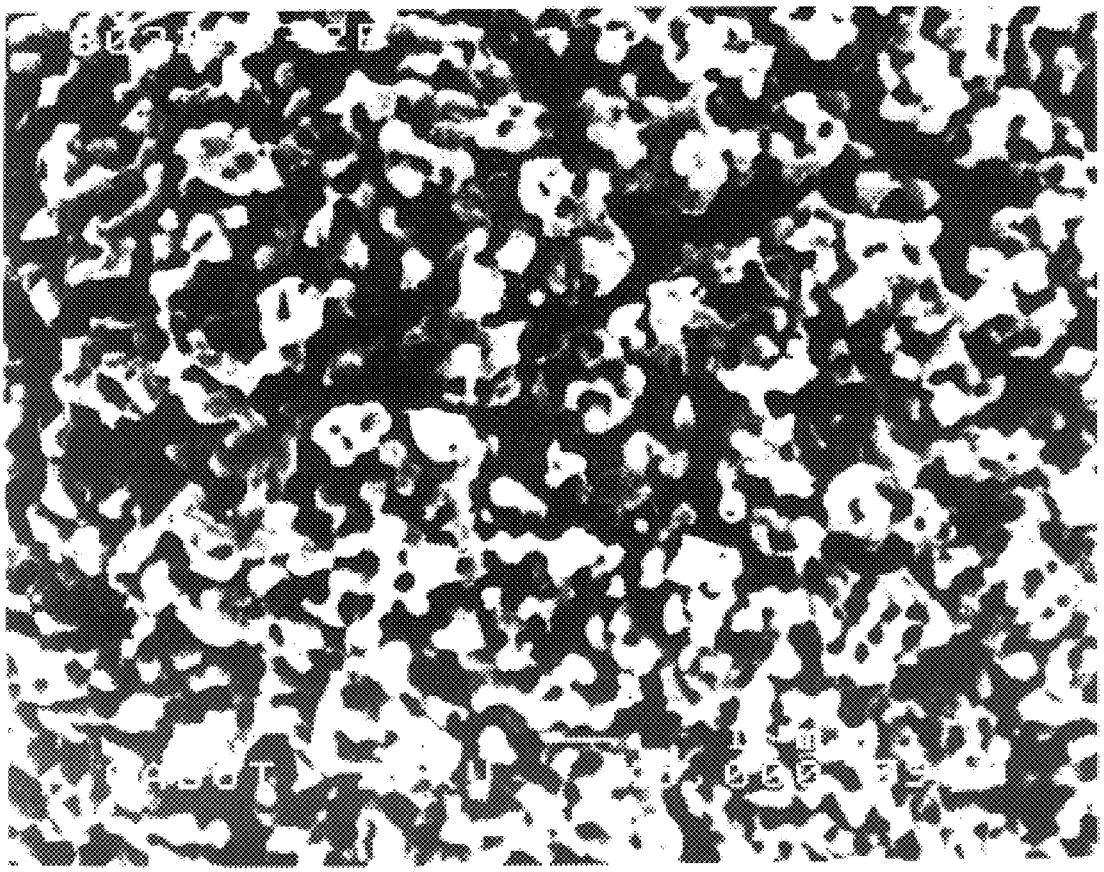
Figure 8:
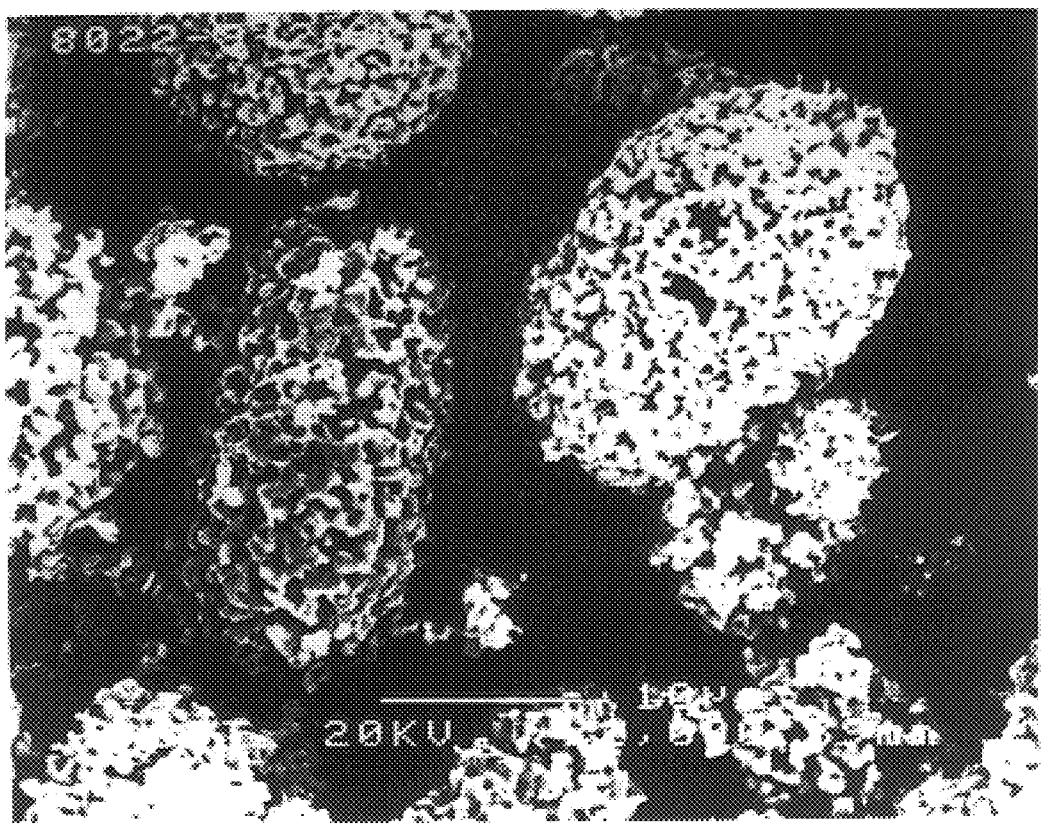
Figure 9:
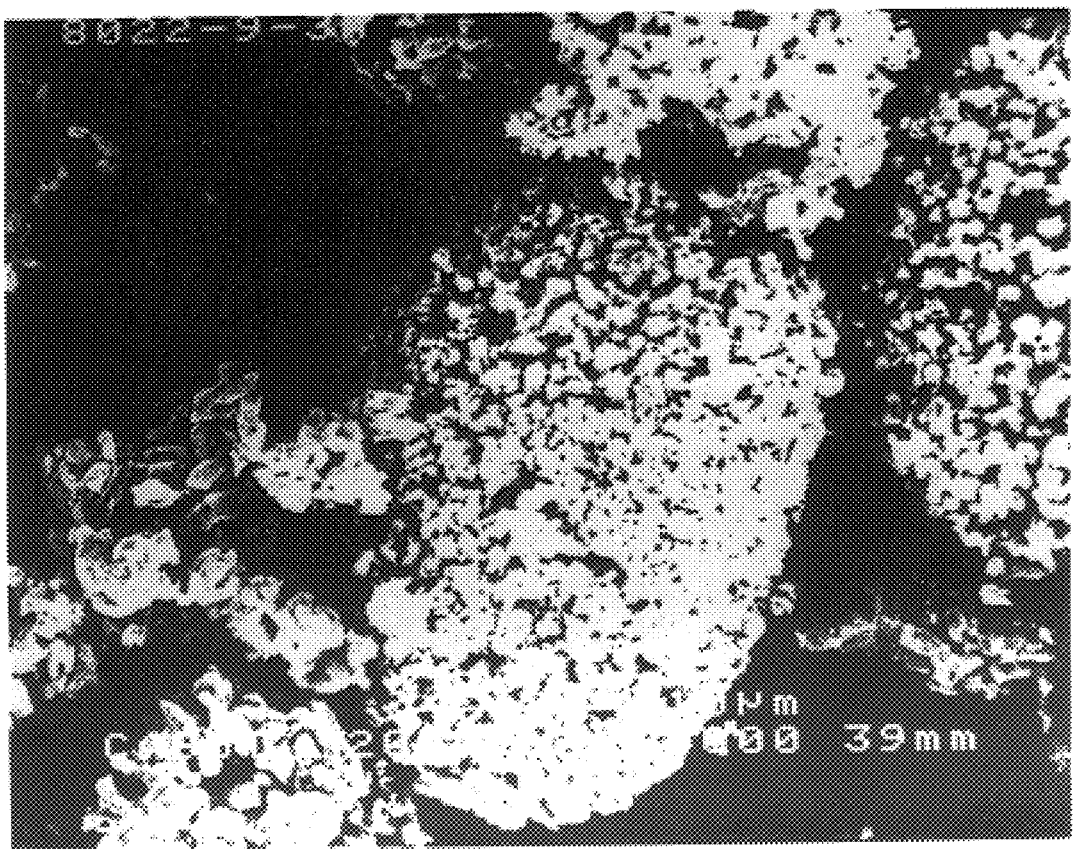
Figure 10:
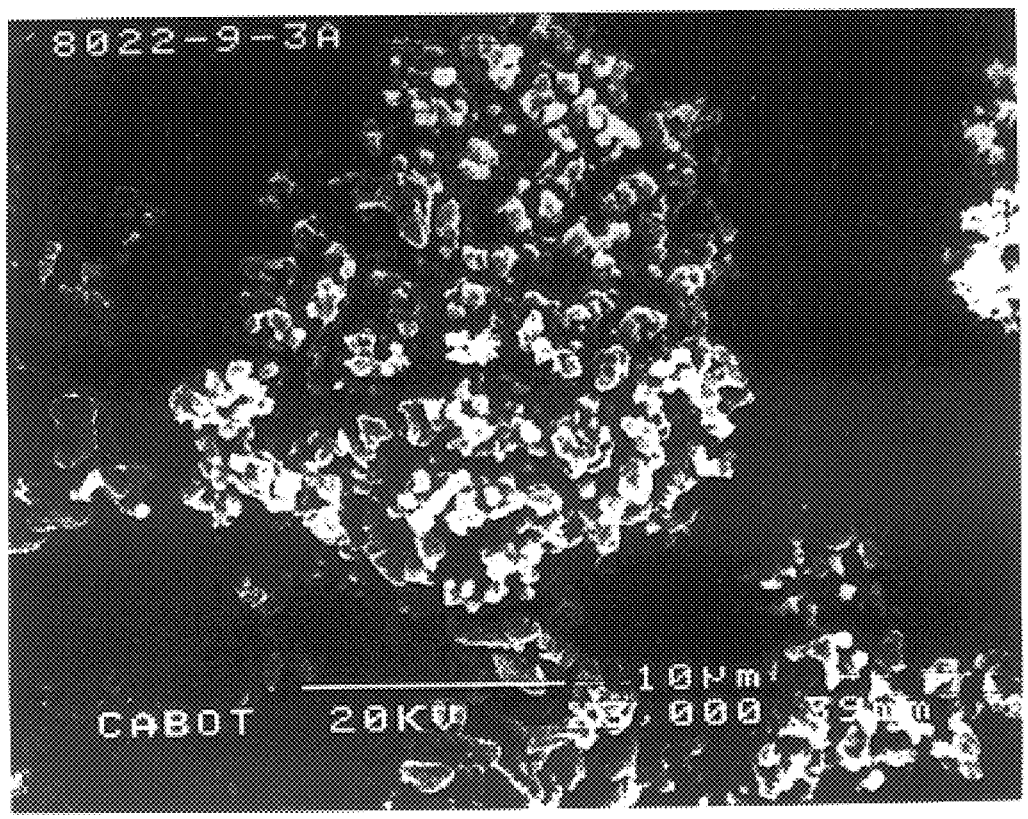
Figure 11:
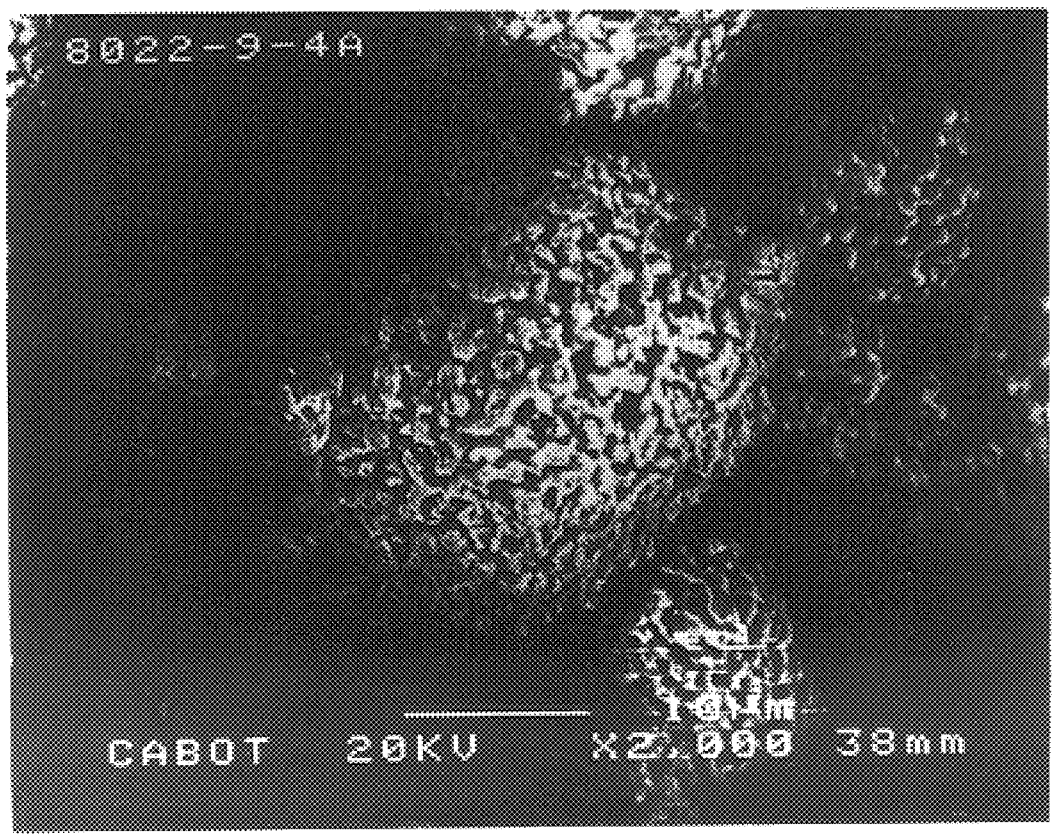

The Table shows the high capacitance and low DC leakage capable of anodes made from the pressed and sintered powders/pellets of the present invention. Microphotographs (SEMs) of various samples were taken. These photographs show the porous structure of the reduced oxygen niobium oxide of the present invention. In particular, FIG. 1 is a photograph of the outer surface of a pellet taken at 5,000× (sample 15). FIG. 2 is a photograph of the pellet interior of the same pellet taken at 5,000×. FIGS. 3 and 4 are photographs of the outer surface of the same pellet at 1,000×. FIG. 5 is a photograph of sample 11 at 2,000×and FIGS. 6 and 7 are photographs taken of sample 4 at 5,000×. FIG. 8 is a photograph taken of sample 3 at 2,000×and FIG. 9 is a photograph of sample 6 at 2,000×. Finally, FIG. 10 is a photograph of sample 6, taken at 3,000×and FIG. 11 is a photograph of sample 9 taken at 2,000×.

TABLE

| Sample | Input Material | Gms | Input Getter | Gms | Temp (° C.) | Time (min) | Hydrogen Pressure |
|---|---|---|---|---|---|---|---|
| 1 | −40 mesh calcined $Nb_2O_5$ | 20 (est) | Ta hydride chips | 40 (est) | 1240 | 30 | 3 psi |
| 2 | 60/100 $Nb_2O_5$ | 23.4 | Ta hydride chips | 65.4 | 1250 | 30 | 3 psi |
| 3 | 60/100 $Nb_2O_5$ | 23.4 | Ta hydride chips | 65.4 | 1250 | 30 | 3 psi |
| 4 | 100/325 $Nb_2O_5$ | 32.3 | Ta hydride chips | 92.8 | 1250 | 30 | 3 psi |
| 5 | 100/325 $Nb_2O_5$ | 32.3 | Ta hydride chips | 92.8 | 1250 | 30 | 3 psi |
| 6 | 60/100 $Nb_2O_5$ | 26.124 | Ta hydride chips | 72.349 | 1250 | 90 | 3 psi |
| 7 | 60/100 $Nb_2O_5$ | 26.124 | Ta hydride chips | 72.349 | 1250 | 90 | 3 psi |
| 8 | 200/325 $Nb_2O_5$ | 29.496 | Ta hydride chips | 83.415 | 1250 | 90 | 3 psi |
| 9 | 60/100 $Nb_2O_5$ | 20.888 | Ta hydride chips | 60.767 | 1200 | 90 | 3 psi |
| 10 | 60/100 $Nb_2O_5$ | 20.888 | Ta hydride chips | 60.767 | 1200 | 90 | 3 psi |
| 11 | 200/325 $Nb_2O_5$ | 23.936 | Ta hydride chips | 69.266 | 1200 | 90 | 3 psi |
| 12 | 200/325 $Nb_2O_5$ | 23.936 | Ta hydride chips | 69.266 | 1200 | 90 | 3 psi |
| 13 | 200/325 $Nb_2O_5$ | 15.5 | 14/40 Ta hydride | 41.56 | 1250 | 30 | 3 psi |
| 14 | 200/325 $Nb_2O_5$ | 10.25 | 14/40 Ta hydride | 68.96 | 1250 | 30 | 3 psi |
| 15 | $Nb_2O_5$ pellets | 3.49 | 14/40 Ta hydride | 25.7 | 1250 | 30 | 3 psi |
| 16 | 200/325 $Nb_2O_5$ | 13.2 | 14/40 Ta hydride | 85.7 | 1200 | 30 | 3 psi |
| 17 | 200/325 $Nb_2O_5$ | 14.94 | 14/40 Ta hydride | 41.37 | 1200 | 30 | 3 psi |
| 18 | 200/325 $Nb_2O_5$ | 11.92 | N200 Nb powder | 21.07 | 1200 | 30 | 3 psi |
| 19 | 200/325 $Nb_2O_5$ | 10 | 14/40 Ta hydride | 69 | 1250 | 30 | 100 Torr |
| 20 | 200/325 $Nb_2O_5$ | 16 | 14/40 Ta hydride | 41 | 1250 | 30 | 100 Torr |

*X-Ray Defraction Analysis Results
**Major 1 and 2 refer to primary components present by weight.
***Minor 1 and 2 refer to secondary components present by weight.
Samples 11 and 12 had the same input material. Samples 2 and 3 had the same input material.
Samples 6 and 7 had the same input material. Samples 9 and 10 had the same input material.

| Sample | XRD* Major 1** | XRD* Major 2** | XRD* Minor 1*** | XRD* Minor 2*** | 1300X35v CV/g | 1300X35v na/CV |
|---|---|---|---|---|---|---|
| 1 | | | | | 81297 | 5 |
| 2 | $NbO_{1.1}$ | NbO | TaO | | 115379 | 1.28 |
| 3 | $NbO_{1.1}$ | NbO | TaO | | 121293 | 2.19 |
| 4 | | | | | 113067 | 1.02 |
| 5 | | | | | 145589 | 1.42 |
| 6 | | | | | 17793 | 12.86 |
| 7 | | | | | 41525 | 5.63 |
| 8 | | | | | 17790 | 16.77 |
| 9 | $NbO_{1.1}$ | NbO | $Ta_2O_5$ | | 63257 | 5.17 |
| 10 | $NbO_{1.1}$ | NbO | $Ta_2O_5$ | | 69881 | 5.5 |
| 11 | $NbO_{1.1}$ | NbO | $Ta_2O_5$ | | 61716 | 6.65 |
| 12 | $NbO_{1.1}$ | NbO | $Ta_2O_5$ | | 68245 | 6.84 |
| 13 | $NbO_{0.7}$ | NbO | TaO | $NbO_2$ | 76294 | 4.03 |
| 14 | $NbO_{0.7}$ | NbO | TaO | $NbO_2$ | 29281 | 21.03 |
| 15 | | | | | 70840 | 0.97 |
| 16 | $NbO_2$ | $NbO_{0.7}$ | TaO | NbO | 5520 | 34.33 |
| 17 | | | | | 6719 | 38.44 |
| 18 | Nb | $NbO_{1.1}$ | NbO | | 25716 | 4.71 |
| 19 | | | | | 108478 | 1.95 |
| 20 | | | | | 106046 | 1.66 |

Example 3

Figure 12:
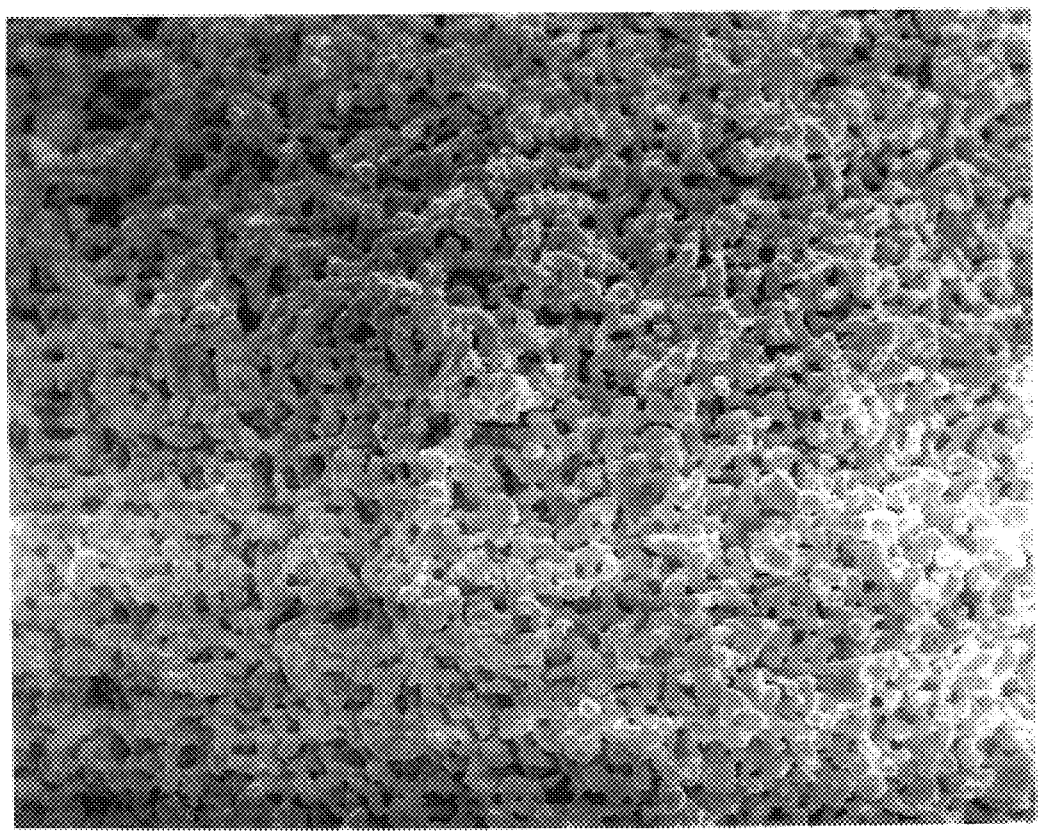
Figure 13:
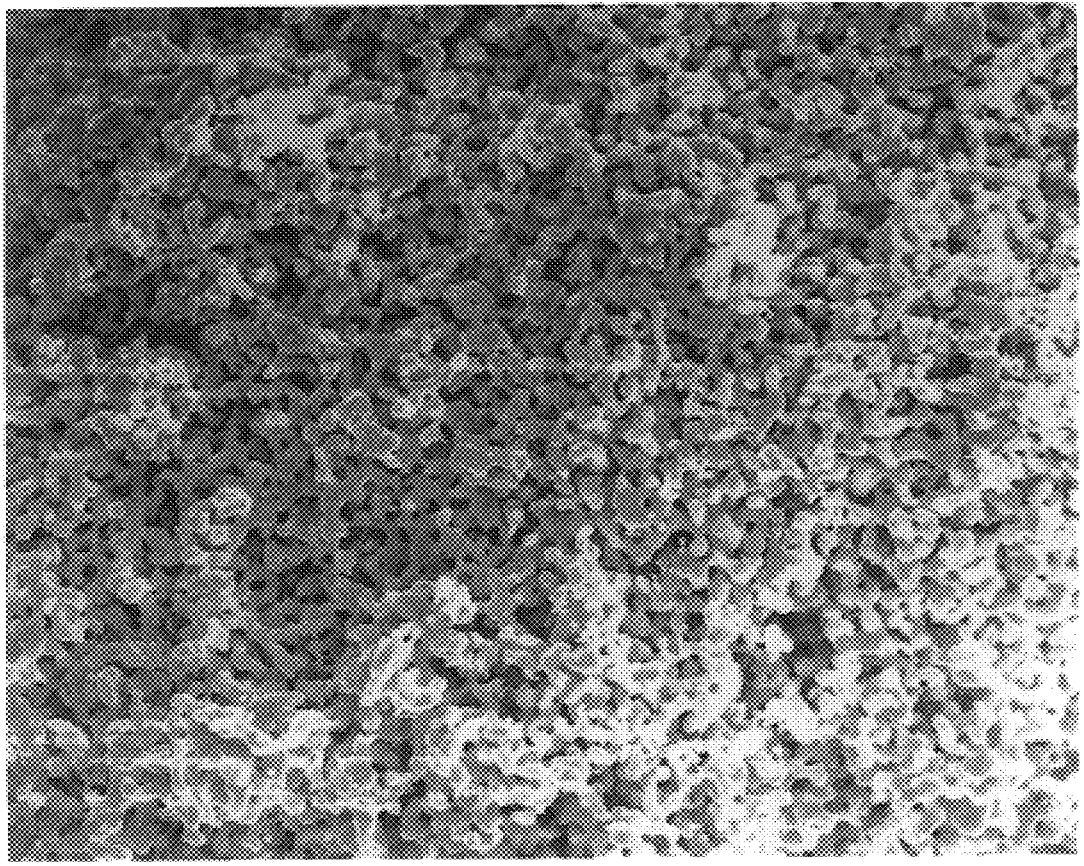
Figure 14:
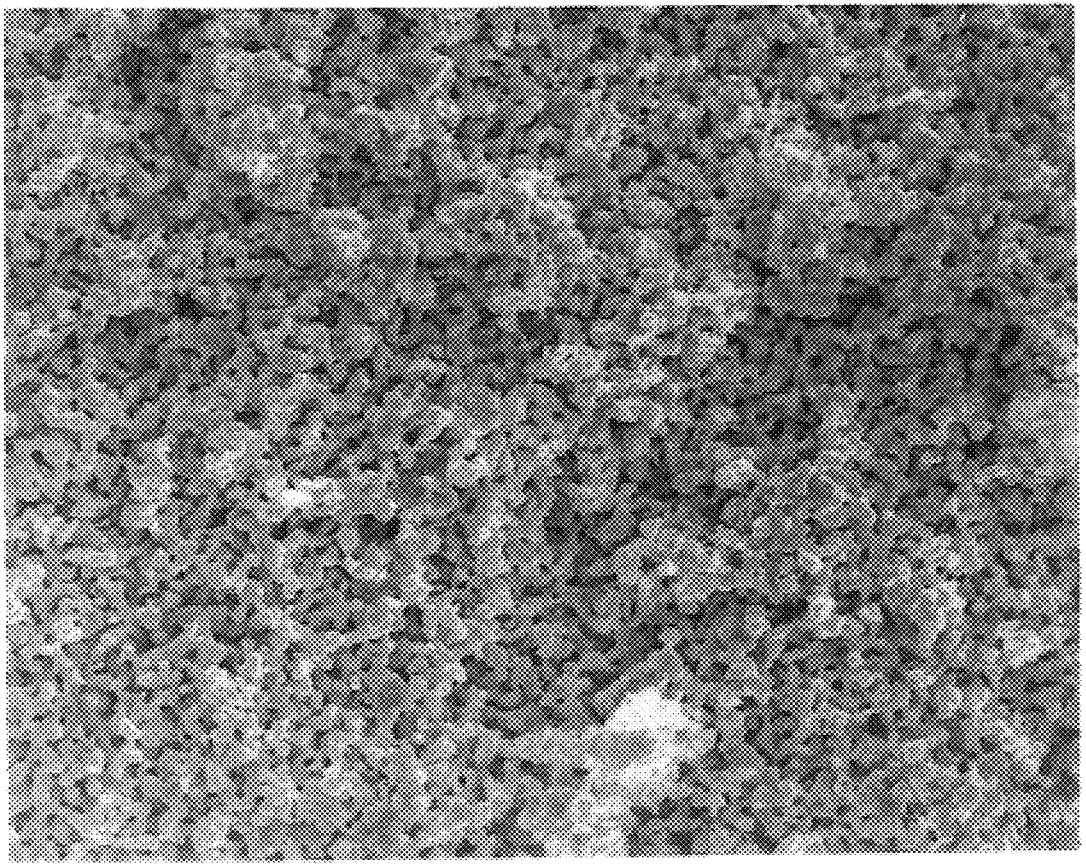

Samples 24 through 28 followed the same procedure as Examples 1 and 2, except as noted in the Table 2 below and except the starting metal oxide was $Ta_2O_5$ (from Mitsui) and the getter material was a tantalum powder having a high surface area and having a nominal capacitance of about 90,000 Cv/g. The starting metal oxide had about the same shape and size as the getter material. The target heat treatment was 1100° C. to 1300° C. In this example, the getter material became part of the oxygen reduced tantalum oxide due to the stoichemetrically proportioning of the materials which achieved essentially the same final oxide state. FIG. 12 is a photograph of sample 26 at 2000×. FIG. 13 is a photograph of sample 27 at 2,000×, FIG. 14 is a photograph of sample 28 at 2,000×. DC leakage and capacitance of the oxygen-reduced tantalum was measured after being formed into anodes by pressing and sintering at 1200° C. using 30 volts as the formation voltage.

TABLE 2

| Sample | Input Material | Goal Oxide | Gms | Input Getter | Gms |
|---|---|---|---|---|---|
| 24 | Ta2O5 | $Ta_6O$ | 3.6 | Nodular Ta | 41.3 |
| 25 | Ta2O5 | $Ta_6O$ | 3.6 | Nodular Ta | 41.3 |
| 26 | Ta2O5 | $Ta_2O_{2.2}$ | 106.3 | Nodular Ta | 110.8 |
| 27 | Ta2O5 | $Ta_2O_{2.2}$ | 106.3 | Nodular Ta | 110.8 |
| 28 | Ta2O5 | $Ta_2O_{2.2}$ | 106.3 | Nodular Ta | 110.8 |

| Sample | Heat Treatment Temp (c) | Time (min) | H2 Pressure | 1200° C. × 30V CV/g | 1200° C. × 30 V na/CV |
|---|---|---|---|---|---|
| 24 | 1100 | 45 | 3 psi | 82,001 | 0.59 |
| 25 | 1200 | 45 | 3 psi | 81,798 | 0.52 |
| 26 | 1300 | 45 | 3 psi | 37,296 | 0.82 |
| 27 | 1300 | 45 | 3 psi | 32,084 | 0.69 |
| 28 | 1300 | 45 | 3 psi | 31,739 | 0.7 |

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electrolytic capacitor anode comprising a valve, metal oxide having an atomic ratio of metal to oxygen of 1: less than 25.

2. The capacitor anode of claim 1, wherein said metal oxide is a tantalum oxide.

3. The capacitor anode of claim 1, wherein said metal oxide is an aluminum oxide.

4. The electrolytic capacitor anode of claim 1, wherein the ratio is 1: less than 2.0.

5. The electrolytic capacitor anode of claim 1, wherein the ratio is 1: less than 1.5.

6. The electrolytic capacitor of claim 1, wherein the ratio is 1:0.167 or 2:2.2.

7. The electrolytic capacitor anode of claim 1, wherein the ratio is 1:1.

8. The electrolytic capacitor anode of claim 1, wherein the ratio is 1:0.5.

9. The electrolytic capacitor anode of claim 1, wherein said valve metal oxide is a tantalum oxide.

10. The electrolytic capacitor anode of claim 4, wherein said valve metal oxide is a tantalum oxide.

11. The electrolytic capacitor anode of claim 5, wherein said valve metal oxide is a tantalum oxide.

12. The electrolytic capacitor anode of claim 6, wherein said valve metal oxide is a tantalum oxide.

13. The electrolytic capacitor anode of claim 7, wherein said valve metal oxide is a tantalum oxide.

14. The electrolytic capacitor anode of claim 8, wherein said valve metal oxide is a tantalum oxide.

15. The electrolytic capacitor anode of claim 1, wherein said valve metal oxide is an aluminum oxide.

16. The electrolytic capacitor anode of claim 4, wherein said valve metal oxide is an aluminum oxide.

17. The electrolytic capacitor anode of claim 5, wherein said valve metal oxide is an aluminum oxide.

18. The electrolytic capacitor anode of claim 6, wherein said valve metal oxide is an aluminum oxide.

19. The electrolytic capacitor anode of claim 7, wherein said valve metal oxide is an aluminum oxide.

20. The electrolytic, capacitor anode, of claim 8, wherein said valve metal oxide is an aluminum oxide.

21. The electrolytic capacitor anode of claim 1; wherein said valve metal oxide has a porous structure.

22. The ectrolytic capacitor anode of claim 1; wherein said valve metal oxide has a porous structure having from about 0.1 to about 10 micrometer pores.

23. The electrolytic capacitor anode of claim 1, wherein said anode has a DC leakage of from about 0.5 to about 5 nA/CV.

24. The electrolytic capacitor anode of claim 1, wherein said valve metal oxide comprises nodular powder, flaked powder, angular powder, or combinations thereof.

25. An electolytic capacitor anode comprising a niobium oxide having an atomic ratio of metal to oxygen of 1:less than 2.5.

26. The electrolytic capacitor anode of claim 25, wherein the niobium oxide having an atomic ratio of metal to oxygen of 1: less than 2.5 is NbO.

27. The electrolytic capacitor anode of claim 25, wherein the niobium oxide, having an atomic ratio of metal to oxygen of 1:less than 2.5 is NbO, $NbO_{0.7}$, $NbO_{1.1}$, or combinations thereof.

28. The electrolytic capacitor anode of claim 25, wherein the niobium oxide has a niobium to oxygen atomic ratio of 1:less than 2.0.

29. The electrolytic capacitor anode of claim 25, wherein the niobium oxide has oxygen levels that are less than stoichiometric for a fully oxidized niobium.

30. The electrolytic capacitor anode of claim 25, wherein the niobium oxide has a micro-porous surface.

31. The method of claim 25, wherein the niobium oxide has a porosity volume of about 50%.

* * * * *

UNITED STATES PATENT AND TRADEMARK OFFICE
CERTIFICATE OF CORRECTION

PATENT NO.    : 6,322,912 B1                                   Page 1 of 1
DATED         : November 27, 2001
INVENTOR(S)   : Fife It is certified that error appears in the above-identified patent and that said Letters Patent is hereby corrected as shown below:

Title page,
Item [54], Title, ELECTROLYTIC CAPACITOR ANODE OF VALVE METAL OXIDE" should read -- METHODS TO PARTIALLY REDUCE CERTAIN METAL OXIDES AND OXYGEN REDUCED METAL OXIDES --
Item [56], FOREIGN PATENT DOCUMENTS, please insert -- 52-80456 7/1997 (JP) --
Item [56], OTHER PUBLICATIONS, "Abstract Document No. 103212" should read -- Abstract Document No. 109:103212 --

Column 6,
Line 36, above Table, insert -- TEST METHODS --.

Column 7,
Line 27, "vacum", should read -- vacuum --.

Column 8,
Line 64, "2,000Xand", should read -- 2,000X and --; and
Line 66, "3,000Xand", should read -- 3,000X and --.

Column 10,
Line 61, "25.", should read -- "2.5." --.

Column 12,
Line 14, "25.", should read -- "2.5." --.

Signed and Sealed this

Twenty-fifth Day of March, 2003

JAMES E. ROGAN
*Director of the United States Patent and Trademark Office*